Patented Jan. 28, 1941

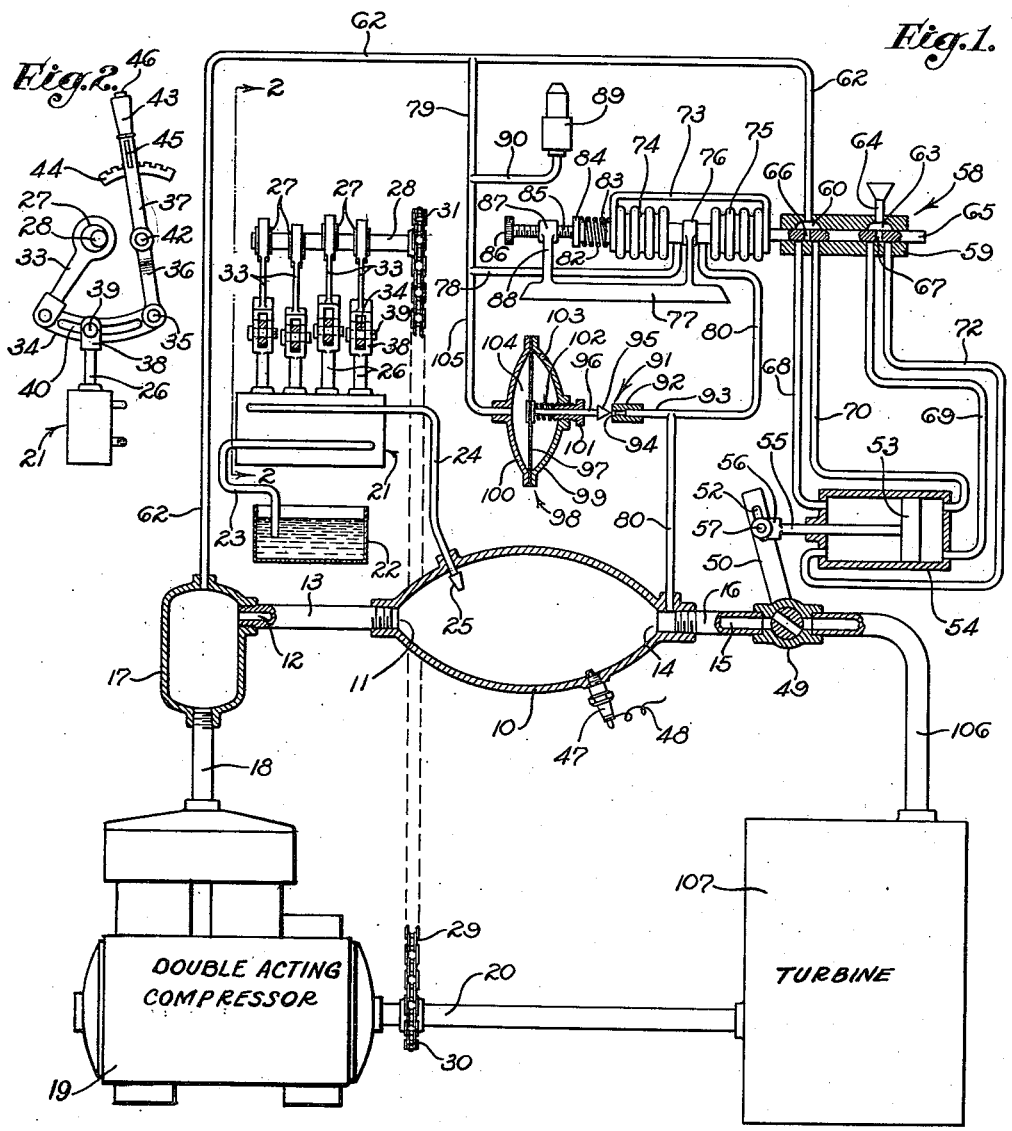

2,229,805

UNITED STATES PATENT OFFICE 2,229,805

COMBUSTION APPARATUS FOR PRODUCING FLUID UNDER PRESSURE

Lester S. Graves, San Luis Obispo, Calif.

Application October 24, 1938, Serial No. 236,823

9 Claims. (Cl. 60—44)

My invention relates to combustion devices of the type that involves the burning of a fuel in a closed chamber to produce a heated gas under pressure.

One object of my invention is to achieve substantially continuous combustion in such a chamber and continuous flow of the products of combustion from the chamber.

Another object of my invention is to regulate the discharge from the combustion chamber automatically in accordance with the pressure conditions in the apparatus. In the preferred form of my invention it is my object to effect such regulation by a discharge valve differentially responsive to pressure at spaced points in the apparatus and in normal operation to hold the pressure of the discharge from the combustion chamber within a predetermined range of pressures regardless of the rate of discharge.

Another object is to interrelate the means for supplying fuel and the means for supplying air to the combustion chamber for the purpose of controlling the ratio between the volumes of fuel and air. As a further object, I propose to vary this ratio at will. In the preferred form of my apparatus I contemplate simply regulating one of the supply means independently of the other.

Viewed broadly, my combustion apparatus may be employed for producing gas under pressure for any useful purpose. For example, the apparatus may be employed as a power source for a prime mover, or as a heating means. In other uses of my invention the discharge from the combustion chamber may be used to treat materials, or otherwise employed in various processes. As an example of one of these uses and to serve the purposes of the present disclosure, I shall describe my apparatus as employed for power generation, but it is to be understood that the invention is also applicable to other purposes as suggested.

The above and other objects of my invention will be apparent in the detailed description to follow, considered with the accompanying drawing, in which:

Fig. 1 is a schematic representation of my apparatus; and

Fig. 2 is a side elevation of the fuel pump incorporated in the combination, the view being as indicated by the line 2—2 of Fig. 1.

The apparatus includes a combustion chamber 10 that has an inlet port 11 communicating with an inlet passage 12 provided by a pipe 13, the combustion chamber also having a discharge port 14 leading to a discharge passage 15 provided by a pipe 16. Air to support combustion is introduced through the pipe 13 and the products of combustion are discharged through the pipe 16, the inlet passage, combustion chamber, and discharge passage comprising a fluid course.

Any of the suitable means known to the art may be employed for supplying air to the combustion chamber. For example, a pressure tank 17 may be connected to the pipe 13 to become part of said fluid course, the pressure tank being supplied with compressed air through a pipe 18 from an air compressor 19. The air compressor conventionally shown at 19 is actuated by a suitable drive shaft 20 and may be of any suitable type, for example, a double-acting two-stage compressor. Since the pulsating flow through the pipe 18 into the pressure tank 17 is to a substantial extent transformed into uniform flow through the pipe 13, the pressure tank may be regarded as a surge tank.

As an example of a suitable fuel-supply means, the drawing shows a pump 21 drawing liquid fuel from a tank 22 through an intake pipe 23 and delivering the fuel through a pipe 24 to a nozzle 25 in the combustion chamber 10. The pump 20 is preferably of the type that incorporates a plurality of plungers timed to cause substantially continuous discharge flow. The drawing shows four plungers 26 actuated by corresponding eccentric discs 27 on a pump drive shaft 28.

To provide a definite relationship between the volume of air and the volume of fuel supplied to the combustion chamber, I may operatively interconnect the air-supply means with the fuel-supply means. This relationship may be achieved by driving the pump shaft 28 from the drive shaft 20 of the compressor. For this purpose the drawing shows a sprocket chain 29 interconnecting a sprocket 30 on the compressor drive shaft 20 and a sprocket 31 on the pump drive shaft 28.

As a further feature of the preferred form of my invention I contemplate providing means to vary at will the ratio between the air and fuel supplied to the combustion chamber. One manner of achieving this end would be to provide means for controlling the effective operation of either of the supply means independently of the other. Accordingly, in the form of my invention indicated by the drawing, I regulate the action of the fuel pump independently of its operative connection with the air compressor.

Each of the eccentric discs 27 on the pump drive shaft 28 is embraced by the upper end of a connecting rod 33, the other end of each connecting rod being pivotally connected to the end of a corresponding arcuate link 34. The other end of each link 34 is pivotally connected to a cross rod 35 carried by a yoke 36 at the lower end of a control lever 37. The upper end of each plunger 26 terminates in a clevis 38 that carries a pin 39 engaged with an arcuate slot 40 in the corresponding link 34. The lever 37 has a pivot 42 and is formed with a handle 43 for convenience of manipulation. To provide for maintaining the control lever 37 in selected positions, a latch mechanism may be provided including, for example, an arcuate rack 44 for engagement by a latch member 45, the lever being provided with a manual release 46 for the latch member. It will be apparent to those skilled in the art that such a fuel pump may be adjusted through a range of selected positions from a position of maximum fluid delivery with the connecting rods 33 adjacent the plungers 26 to a position of minimum or no fluid delivery with the cross bar 35 at the lower end of the control lever 37 placed adjacent the plungers 26. In other words, shifting the lever 37 leftward as viewed in Fig. 2 increases the rate of fluid delivery and shifting the lever to the right decreases the rate of fluid delivery.

The combustion chamber 10 is provided with some suitable means for igniting the fuel charge, for example, a spark plug 47 energized through a wire 48.

In the preferred form of my invention, the discharge passage 15 is provided with a pressure-responsive discharge valve for automatically controlling flow from the combustion chamber in accordance with the rate that air is introduced into the combustion chamber, or, in normal operation, such rate plus the rate required by the additional volume of gas generated in the combustion chamber. While various pressure-responsive control arrangements known to the art may be used in my combination, I prefer to employ an arrangement whereby the operative disposition of the valve controlling the discharge passage 15 is determined by the differential between pressures at spaced points in the fluid course rather than by absolute pressure at one point. The preferred arrangement is indicated in the drawing.

The discharge valve conventionally shown at 49 is operated by a handle 50 having a slot 52. The valve handle 50 is, in turn, mechanically operated by a pressure-responsive means such as a piston 53 in a cylinder 54, the operating connection being through a piston rod 55 having a clevis 56 at its outer end, in which clevis a pin 57 is mounted in sliding engagement with the slot 52.

Associated with the cylinder 54 is a control valve 58 adapted to respond to pressure conditions in the fluid course of the apparatus upstream from the discharge valve 49. The control valve includes a valve body 59 having an inlet chamber 60 communicating with an inlet pipe 62 and an exhaust chamber 63 communicating with an exhaust pipe 64. The pipe 62 may communicate with the fluid course anywhere on the inlet side of the combustion chamber 10. In the preferred form of my invention the pipe is connected to the pressure tank 17 which may be considered a part of the inlet passage of the fluid course. A valve member 65, which may be referred to as a control plunger, is mounted to reciprocate longitudinally in the valve body 59, the control plunger having a transverse inlet bore 66 in continuous communication with the inlet chamber 60 and a transverse exhaust bore 67 in continuous communication with the exhaust chamber 63.

When the control plunger 65 is moved sufficiently to the left, as viewed in the drawing, the inlet bore 66 provides communication between the inlet chamber 60 and a pipe 68 leading to the left end of the cylinder 54 and simultaneously the exhaust bore 67 in the control plunger provides communication between the exhaust chamber 63 and an exhaust pipe 69 leading from the right end of the cylinder 54. When the control plunger is moved contrariwise to the right a sufficient distance, the inlet bore 66 establishes communication between the inlet chamber 60 and a pipe 70 leading to the right end of the cylinder 54 and simultaneously the exhaust bore 67 establishes a communication between the exhaust passage 63 and an exhaust pipe 72 leading from the left end of the cylinder 54. By virtue of this arrangement, movement of the control plunger to the left results in movement of the piston 53 to the right to move the valve 49 towards closed position, and movement of the control plunger to the right causes the piston to shift to the left to move the valve 49 towards an open position. At an intermediate position of the control plunger 65, no communication is provided between the cylinder 54 and either the inlet chamber 60 or the exhaust chamber 63 of the control valve.

The control plunger 65 is operatively connected with a control yoke 73 that confines a pair of opposed pressure-responsive expansible members, such as bellows 74 and 75. The two opposed bellows are separated by a fixed arm 76 extending from a base 77, so that relative increase of pressure in the bellows 74 tends to move the yoke to the left, as viewed in the drawing, and relative increase of pressure in the bellows 75 tends to move the yoke to the right, the control plunger 65 following the movements of the yoke. The interior of the bellows 74 communicates by means of pipes 78 and 79 with the aforementioned pipe 62, and the interior of the bellows 75 is connected by a pipe 80 to the fluid course of the apparatus on the outlet side of the combustion chamber, the drawing showing the pipe connecting with the discharge passage 15 near the discharge port 14 of the combustion chamber.

In the particular form of my invention depicted by the drawing, when the two bellows 74 and 75 are equally expanded, the control plunger 65 takes the intermediate position heretofore described at which the cylinder 54 is cut off from communication with the chambers 60 and 63 of the control valve 58. With a combination limited to only the elements described to this point, there would be a tendency for the control plunger to take the intermediate position when the pressure in the tank 17 substantially equals the pressure in the discharge passage 15, the valve 49 automatically seeking a position to provide such pressure equalization. By adding means to supplement the force that is exerted by the bellows 75 between the fixed arm 76 and the yoke 73, I may have the control plunger 65 take the intermediate position when the pressure in the bellows 75 is substantially lower than the pressure in the bellows 74, thereby causing the valve 49 to seek a position that favors lower pressure in the fluid course of the apparatus downstream from the combustion chamber than in the fluid course upstream from the combustion chamber. Such a loading of the control valve to promote flow through the fluid course may be had by providing a suitable spring 82 engaging a lug 83 on the end of the yoke 73 opposite from the control plunger 65, the outer end of the spring 82 being seated on a retaining member 84. In the preferred form of my invention, the retaining member 84 is integral with an adjustment screw 85 having a knurled head 86, the screw being threaded into a stationary sleeve 87 at the end of a second arm 88 extending from the base member 77. The adjustment of the loading on the control valve by the spring 82 is not critical in the operation of my apparatus, but it is to be noted that the spring pressure may be such as to cause opening movement of the discharge valve 49 whenever the pressures in the two bellows are equal or have some other selected relationship.

To preclude the development of excessive pressure on the inlet side of the combustion chamber, I may include in my combination a blow-off valve 89 carried by a pipe 90 in communication with the pipe 79, the valve being of a conventional type adjustable to open at a predetermined pressure. Opening of the blow-off valve 89 will cause the pressure to drop in the bellows 74 so that the control plunger 65 will be moved to the right, which movement will cause the discharge valve 49 to be moved to a wider open position.

For a purpose that will be explained later, I find it desirable in some practices of my invention to provide an auxiliary relief valve in communication with the pipe 80, the valve being responsive to pressure in the pipes 62, 79, and 78. Such an auxiliary relief valve 91 is shown diagrammatically in the drawing as including a valve body 92 on a pipe 93 branching from the pipe 80, the valve body providing a valve seat 94 to receive a complementary valve member 95. The valve member 95 is mounted on a valve stem 96 that is connected with a diaphragm 97 in a casing 98 that is formed by two complementary sections 99 and 100. The valve stem 96 slides axially through a suitable bushing 101 adjustably threaded into the casing section 99, and a suitable helical spring 102 embracing the stem 96 is confined between the diaphragm 97 and the inner end of the bushing 101. By virtue of a breather port 103, atmospheric pressure is maintained within the casing section 99. The other casing section 100 defines with the diaphragm 97 a pressure chamber 104, which pressure chamber has a pipe 105 in communication with the pipes 78 and 79. Unless the pressure in the chamber 104 is sufficient to overcome the effect of atmospheric pressure and the force of the spring 102 acting on the opposite face of the diaphragm, this auxiliary valve is open to provide communication between the pipe 80 and the atmosphere, thereby limiting the pressure in the bellows 75. The blow-off valve and the relief valve serve to set the upper and lower pressure limits respectively of normal operation and cooperate with the other elements in the control arrangement to hold closely to a predetermined range the pressure of the discharge from the combustion chamber regardless of variations in the rate of that discharge.

The products of combustion discharged through the passage 15 and the valve 49, in the particular form of the invention chosen for illustration, are conducted by a suitable pipe 106 to a prime mover 107 for the energization thereof. Those familiar with the art will understand that various types of prime movers may be successfully used in such a combination, including various types of turbines and reciprocating engines. The shaft 20 that actuates the air compressor and the fuel pump may be driven by the prime mover 107, as indicated in the drawing, or may be connected with some outside source of power.

For the purpose of describing a typical mode of operation of my apparatus, let it be assumed that the compressor 19 normally delivers to the pressure tank 17 air compressed to two hundred and fifty pounds per square inch; that the fuel pump 21 adjusted for maximum stroke will deliver the optimum amount of fuel for combustion with the maximum quantity of air supplied by the compressor; that the blow-off valve 89 is set for a pressure of two hundred and fifty pounds per square inch; that the spring 102 in the auxiliary relief valve is adjusted to permit the valve member 95 to move out of its seat in the valve body 92 when the pressure in the pipe line 105 drops below two hundred and forty pounds per square inch; and that the spring 82 acting against the yoke 73 is adjusted to favor approximately an eight pound differential between the pressure in the pressure tank 17 and the pressure in the discharge passage 15.

To start the apparatus from an inoperative state with the combustion chamber cold and the discharge valve 49 in either open or closed position, the fuel pump is first rendered substantially inoperative by shifting the control lever 37 to the position of minimum pump stroke, and then external means (not shown) is employed to actuate the compressor 19 and its associated shaft 20.

If the discharge valve 49 is completely closed, the pressure rise in the fluid course is relatively rapid notwithstanding the fact that the valve member 95 of the auxiliary relief valve is open. If the discharge valve 49 is open it will soon be closed as the result of the initial operation of the compressor. To make clear this closing action of the valve 49, let us assume that the initial operation of the compressor builds up a partial pressure of seventeen pounds at the pressure tank 17 with the pressure dropping to four pounds in the discharge passage 15. These pressures are transmitted to their respective bellows 74 and 75 and the higher pressure in the bellows 74 will cause the control plunger 65 to move leftward, which leftward movement will result in the closing movement of the valve 49.

From the beginning of the pressure rise until a pressure of approximately two hundred and forty pounds is reached in the chamber 104 associated with the auxiliary relief valve compressed air will continue to be vented through the pipe 93. As soon as a pressure of two hundred and forty pounds is attained in the chamber 104, the auxiliary relief valve member 95 closes the pipe 93 with the result that pressure builds up in the bellows 75. As the pressure of the bellows 75 supplemented by the pressure of the spring 82 approaches a balance with the pressure of the bellows 74, the control plunger 65 is moved to the right to the intermediate position, cutting off all communication between the chambers 60 and 63 and the cylinder 54.

If at this time the discharge valve 49 is open sufficiently to permit air to escape from the combustion chamber as fast as it is supplied by the compressor, and the pressure in the pipe 62 is below the point at which the blow-off valve 89 automatically opens and is above the point at which the auxiliary relief valve automatically opens, the control plunger 65 will remain in its intermediate position and the partially open position of the discharge valve 49 is maintained. Generally, however, the discharge valve 49 is at this point either closed or too near a closed position to accommodate the volume of air supplied by the compressor the result being that the pressure in the line 80 rapidly climbs and causes the control valve 58 to function, opening the discharge valve 49. Rise of pressure above the predetermined point resulting in opening of the blow-off valve 89 causes the pressure in the bellows 74 to drop sharply, whereupon the control plunger 65 moves to the right and causes the valve 49 to move toward its fully open position. Generally, there will be a series of unbalances on either side before the valve 49 finally takes a position to discharge substantially the same quantity of air that is introduced by the compressor.

When such a condition of equilibrium is achieved with the flow through the fluid course derived solely from the action of the compressor, the pressure in the pressure tank 17 is somewhere near two hundred and fifty pounds, and the apparatus is ready for operation with fuel. The next step, then, is to energize the spark plug 47 and to shift the lever 37 to an intermediate position to force a continuous stream of fuel into the combustion chamber. Initiation of combustion in the combustion chamber generates additional volumes of gas to be accommodated by the discharge valve 49. The discharge valve 49 automatically opens sufficiently to provide the required rate of discharge.

Once the apparatus is in normal operation, the valve 49 automatically seeks a position to accommodate the volume of gas supplied by the compressor plus the volume of additional gas provided by combustion. Since the volume of gas provided by combustion depends upon the ratio of fuel to the ratio of air supplied to the combustion chamber at any predetermined pressure and temperature of operation, it follows that the position of the valve 49 in the normal operation of the apparatus is determined by the position of the pump control lever 37. When the flow from the fluid course is employed to supply energy to a prime mover, as in the arrangement shown in the drawing, the power delivered to the prime mover is controlled simply by manipulation of the fuel pump lever 37.

The design of my apparatus to provide a balanced combination is within the skill of those familiar with the art. Thus, for a combustion chamber of a given capacity, fuel-supply means and air-supply means of certain capacities will be indicated, and the prime mover will be designed with consideration for the range of flow from the fluid course of the apparatus.

Attention is directed to the fact that the adjustment screw 86 may be set to compensate for various factors in the control system. For example, pressure drop in the control pipes may be a consideration. Again the fact that one control pipe communicates with a point in the fluid course where the stream is of relatively large cross-sectional area and the other control pipe communicates with a point of restricted flow may be a factor affecting the control function. These factors may be met, however, without the necessity of identifying or isolating them by simply manipulating the adjustment screw 86 controlling the pressure of the spring 82 until the desired operation of the apparatus as a whole is observed.

When the control system is studied analytically it becomes apparent to one skilled in this art that the character of the control functions provided may vary widely with different embodiments of my fundamental concept. For example, if one of the two branches of the control system represented by the pipes 62 and 68 is substantially longer than the other or relatively restricted, a pressure change originating in the main fluid course of the apparatus will affect one of the bellows before the other, and this factor may be emphasized in the design of the control system to cause movement of the discharge valve 49 consequential to each such pressure change. A further example may be found in considering the effect of shifting the point at which the pipe 90 associated with the blow-off valve connects with the fluid system of the control or the effect of inserting restrictions in the fluid system to affect the results of blow-off valve operation.

With these considerations in mind, it will be noted that the path from the main fluid course of the apparatus to the bellows 74 through the pipes 62, 79, and 78 is longer than the other path through the pipe 80 to the bellows 75. A sudden and violent increase in pressure will reach the bellows 75 first and tend to cause the discharge valve 49 to open. Conceivably the discharge valve might open sufficiently to keep pressure in the fluid course within bounds without any action required on the part of the blow-off valve.

The description and specific arrangement of my invention, set forth herein for the purposes of disclosure and illustration, suggest a wide range of modification and substitution without departing from the principles of my invention, and I specifically reserve the right to all such changes and substitutions that come within the scope of my appended claims.

I claim as my invention:

1. In an apparatus of the character described for supplying a continuous stream of gas at substantially above atmospheric pressure, the combination of: a combustion chamber having an inlet passage and a discharge passage constituting therewith a fluid course; means for introducing air under pressure substantially continuously into said chamber through said inlet; adjustable means for introducing fuel under pressure substantially continuously into said chamber for gas generation by combustion therein; valve means controlling said discharge passage; means responsive to a first point and a second point downstream therefrom in said fluid stream for maintaining a predetermined pressure drop between said points whereby the valve is adjusted automatically in accordance with the rate of gas generation in said combustion chamber when fuel is being burned therein or in accordance with the rate of air introduction when no fuel is being burned; and means responsive to pressure in said fluid stream to increase the flow through said valve when said pressure exceeds a predetermined absolute value.

2. A combination as set forth in claim 1 in which is provided means responsive to pressure in said fluid stream to decrease the flow through said valve when said pressure drops below a predetermined absolute value.

3. In an apparatus of the character described for supplying a continuous stream of gas at substantially above atmospheric pressure, the combination of: a combustion chamber having an inlet passage and a discharge passage constituting therewith a fluid course; means for introducing air under pressure substantially continuously into said chamber through said inlet; adjustable means for introducing fuel under pressure substantially continuously into said chamber for gas generation by combustion therein; valve means controlling said discharge passage; means to decrease flow through said discharge passage when the pressure therein falls below a predetermined differential under the pressure in said inlet passage; and means to increase flow through said discharge passage when the pressure therein rises above a predetermined differential below the pressure in said inlet passage.

4. In an apparatus of the character described for supplying a continuous stream of gas at substantially above atmospheric pressure, the combination of: a combustion chamber having an inlet passage and a discharge passage constituting therewith a fluid course; means for introducing air under pressure substantially continuously into said chamber through said inlet; adjustable means for introducing fuel under pressure substantially continuously into said chamber for gas generation by combustion therein; valve means controlling said discharge passage; means to decrease flow through said discharge passage when the pressure therein falls below a predetermined differential below the pressure in said inlet passage; and means to increase flow through said discharge passage when the pressure in said inlet passage exceeds a predetermined value.

5. In an apparatus of the character described for supplying a continuous stream of gas at substantially above atmospheric pressure, the combination of: a combustion chamber having an inlet passage and a discharge passage constituting therewith a fluid course; means for introducing air under pressure substantially continuously into said chamber through said inlet; adjustable means for introducing fuel under pressure substantially continuously into said chamber for gas generation by combustion therein; valve means controlling said discharge passage; means to decrease flow through said discharge passage when the pressure therein falls below a predetermined differential below the pressure in said inlet passage; means to decrease flow through said discharge passage when the pressure in said inlet passage drops below a predetermined value; and means to increase flow through said discharge passage when the pressure in said inlet passage exceeds a predetermined value.

6. In an apparatus of the character described for supplying a continuous stream of gas at substantially above atmospheric pressure, the combination of: a combustion chamber having an inlet passage and a discharge passage constituting therewith a fluid course; means for introducing air under pressure substantially continuously into said chamber through said inlet; adjustable means for introducing fuel under pressure substantially continuously into said chamber for gas generation by combustion therein; valve means controlling said discharge passage; a first fluid-pressure-actuated means responsive to pressure at a first point in said fluid course to urge said valve toward closed position; a second fluid-pressure-actuated means responsive to pressure at a second point in said fluid course downstream from said first point to urge said valve toward open position in opposition to said first fluid-pressure-actuated means; and means cooperative with said second fluid-pressure-actuated means to urge said valve toward open position in opposition to said first fluid-pressure-actuated means to cause a pressure drop between said points in the fluid course.

7. A combination as set forth in claim 6 in which there is fluid-release means responsive to pressure in said fluid course to reduce the pressure transmitted to said first fluid-pressure-actuated means when the pressure in said fluid course exceeds a predetermined value, thereby permitting said valve to be urged toward open position by said second fluid-pressure-actuated means and by said cooperative means.

8. A combination as set forth in claim 6 in which there is fluid-release means responsive to pressure in said fluid course to reduce the pressure transmitted to said second fluid-pressure-actuated means when the pressure in said fluid course drops to a predetermined value, thereby permitting said valve to be urged toward closed position by said first fluid-pressure-actuated means.

9. In an apparatus of the character described for supplying a continuous stream of gas at substantially above atmospheric pressure, the combination of: a combustion chamber having an inlet passage and a discharge passage constituting therewith a fluid course; means for introducing air under pressure substantially continuously into said chamber through said inlet; adjustable means for introducing fuel under pressure substantially continuously into said chamber for gas generation by combustion therein; valve means controlling said discharge passage; and means responsive to fluid pressure in said fluid course at a first point on the inlet side of said combustion chamber and a second point on the outlet side of said combustion chamber respectively, said responsive means being adapted to move said valve means toward open position when the pressure at said second point rises above a predetermined differential below the pressure at said first point, said responsive means being adapted to move said valve means toward open position when the pressure at one of said points rises to a predetermined magnitude, said responsive means being adapted to move said valve means toward closed position when the pressure at one of said points drops to a second predetermined magnitude.

LESTER S. GRAVES.